US011025144B2

(12) United States Patent
Li et al.

(10) Patent No.: US 11,025,144 B2
(45) Date of Patent: Jun. 1, 2021

(54) OUTER ROTOR MOTOR HAVING SUPPORT MEMBER

(71) Applicant: Johnson Electric S.A., Murten (CH)

(72) Inventors: Yue Li, Hong Kong (CN); Mao Xiong Jiang, Shen Zhen (CN); You Qing Xiang, Shen Zhen (CN); Jian Zhao, Shen Zhen (CN); Yong Wang, Shen Zhen (CN); Yong Li, Shen Zhen (CN); Yan Fei Liao, Shen Zhen (CN)

(73) Assignee: Johnson Electric International AG, Murten (CH)

(*) Notice: Subject to any disclaimer, the term of this patent is extended or adjusted under 35 U.S.C. 154(b) by 451 days.

(21) Appl. No.: 15/378,744

(22) Filed: Dec. 14, 2016

(65) Prior Publication Data

US 2017/0179803 A1   Jun. 22, 2017

(30) Foreign Application Priority Data

Dec. 16, 2015  (CN) .................. 2015 1094 6689.1
Oct. 8, 2016   (CN) .................. 2016 1087 8877.X (51) Int. Cl.
*H02K 21/22* (2006.01)
*H02K 11/33* (2016.01)
*H02K 5/18* (2006.01)

(52) U.S. Cl.
CPC ............ *H02K 21/22* (2013.01); *H02K 11/33* (2016.01); *H02K 5/18* (2013.01)

(58) Field of Classification Search
CPC .......... H02K 21/22; H02K 11/33; H02S 5/04; H02S 5/15
See application file for complete search history.

(56) References Cited

U.S. PATENT DOCUMENTS

| | | | |
|---|---|---|---|
| 4,604,665 A * | 8/1986 | Muller ................ | G11B 17/038 310/67 R |
| 5,508,578 A | 4/1996 | Suzuki et al. | |
| 9,742,242 B2 * | 8/2017 | Watanabe ............... | H02K 3/24 |

(Continued)

FOREIGN PATENT DOCUMENTS

| | | |
|---|---|---|
| CN | 1461095 A | 12/2003 |
| JP | S58127552 A | 7/1983 |

(Continued)

*Primary Examiner* — Nguyen Tran
(74) *Attorney, Agent, or Firm* — Muncy, Geissler, Olds & Lowe, P.C.

(57) ABSTRACT

A motor includes a stator, a rotor rotatable relative to the stator, a support member, and a circuit assembly. The circuit assembly includes a plurality of electronic components. The rotor is rotatably mounted to the support member. The stator is received in the rotor. The stator is fixed to the support member, and the support member is at least partially received in an inner side of the stator. A portion of the support member received in the inner side of the stator defines a receiving space, and at least part of the electronic components of the circuit assembly is received in the receiving space of the support member. The support member is partially received in the inner side of the stator, and the circuit assembly is at least partially received in the support member, which makes the motor have a relatively smaller axial size.

15 Claims, 11 Drawing Sheets

(56) References Cited

U.S. PATENT DOCUMENTS

| | | | | |
|---|---|---|---|---|
| 2013/0278094 A1* | 10/2013 | Peterson | ................ | H02K 3/345 |
| | | | | 310/64 |
| 2015/0381006 A1* | 12/2015 | Allen | .................... | H02K 1/148 |
| | | | | 417/423.7 |
| 2016/0111940 A1* | 4/2016 | Oyama | ................ | F04D 25/068 |
| | | | | 417/423.7 |

FOREIGN PATENT DOCUMENTS

| JP | H0568363 A | 3/1993 |
|---|---|---|
| JP | 2008306917 A | 12/2008 |

\* cited by examiner

OUTER ROTOR MOTOR HAVING SUPPORT MEMBER

CROSS REFERENCE TO RELATED APPLICATIONS

This non-provisional patent application claims priority under 35 U.S.C. § 119(a) from Patent Application No. 201510946689.1 filed in The People's Republic of China on Dec. 16, 2015, and Patent Application No. 201610878877.X filed in The People's Republic of China on Oct. 8, 2016.

FIELD OF THE INVENTION

This invention relates to a driving device, and in particular, to a motor.

BACKGROUND OF THE INVENTION

Motors, especially brushless direct current (BLDC) motors, usually each includes a stator core, a rotor shaft, a housing, a support member, and a circuit assembly. The rotor shaft is rotatably received in the stator core, and the housing is fixed to one end of the rotor shaft and surrounds a circumferential edge of the stator core. The support member is rotatably attached around the rotor shaft and is disposed adjacent the stator core. The circuit assembly is received in the support member and disposed at one end of the support member away from the rotor shaft. However, such motors have large axial sizes.

SUMMARY OF THE INVENTION

Thus, there is a desire for a motor with compact structure.

A motor includes a stator, a rotor, a support member, and a circuit assembly. The circuit assembly includes a plurality of electronic components. The rotor is rotatably mounted to the support member. The stator is received in the rotor. The support member is at least partially received in and fixed to an inner side of the stator. A portion of the support member received in the inner side of the stator defines a receiving space, and at least part of the electronic components of the circuit assembly is received in the receiving space.

Preferably, the motor further comprises a motor shaft, one end of the motor shaft is fixed to one of the rotor and the support member, and the other end of the motor shaft is rotatably mounted to the other one of the rotor and the support member.

Preferably, the rotor comprises a housing and a plurality of permanent magnets, the motor shaft is a rotary shaft having a connecting end and an output end, the housing is fixed to the output end of the rotary shaft, the permanent magnets are arranged along an inner circumferential periphery of the housing, the stator is received in the housing and comprises a stator core, stator windings wound around the stator core, and an insulating bracket disposed between the stator core and the stator windings, the stator core comprises a yoke and teeth extending outwardly from the yoke, the insulating bracket comprises a main portion covering the yoke and a plurality of extensions extending outwardly from the main portion and covering the teeth, an inner side of the main portion defines an accommodating cavity, and the support member is at least partially received in the accommodating cavity.

Preferably, the support member comprises an inner wall, a bottom wall and an outer wall, the connecting end of the rotary shaft is rotatably mounted to the inner wall, the bottom wall extends radially outwardly from a circumferential edge of one end of the inner wall that extends into the stator, the outer wall extends from a circumferential edge of the bottom wall in a direction away from the stator, the outer wall and the inner wall define the receiving space therebetween, and the insulating bracket of the stator is fixed to the bottom wall of the support member.

Preferably, the outer wall comprises a support portion and an extension, the support portion extends from the circumferential edge of the bottom wall in a direction away from the stator, the support portion is at least partially disposed at the inner side of the stator, the extension of the outer wall extends radially outwardly from a circumferential edge of a distal end of the support portion and is disposed outside the stator, and the extension of the outer wall is spaced from the housing of the rotor and the stator along an axial direction of the motor.

Preferably, the housing comprises a cover portion and a surrounding portion, the cover portion is fixedly attached around the output end of the rotary shaft and defines a plurality of ventilation slots, the surrounding portion extends from a circumferential edge of the cover portion toward a side of the cover portion where the connecting end of the rotary shaft is located, the surrounding portion cooperates with the cover portion to define a receiving chamber, the stator is received in the receiving chamber, the receiving chamber is in communication with the ventilation slots, an outer circumferential edge of the support portion is recessed to form a plurality of airflow grooves, first ends of the airflow grooves are in communication with the ventilation slots, and second ends of the airflow grooves extend to the extension to communicate with an outside environment.

Preferably, the motor is a brushless direct current motor, and the support member is made from a thermally conductive material.

Preferably, the extension of the outer wall forms a supporting face in the receiving space, the circuit assembly further comprises a circuit board, the electronic components are electrically connected to the circuit board, and the circuit board is coupled to the supporting face of the extension of the outer wall.

Preferably, the extension of the outer wall forms a cutout at one side thereof, the circuit assembly further comprises an electrical plug-connection module electrically connected to the circuit board, and the electrical plug-connecting module is disposed at the cutout of the extension of the outer wall and supported on the stator.

Preferably, the electrical plug-connection module comprises a support housing and power pins, signal pins and wiring pins extending into the support housing, the support housing covers the cutout, the power pins, signal pins and wiring pins are arranged in parallel and electrically connected to the circuit board, and the wiring pins are electrically connected to the stator windings.

Preferably, an end face of the extension of the outer wall defines an annular sealing groove, a sealing plate is mounted to one side of the support member opposite from the housing and covers the circuit assembly, an annular sealing rib protrudes from a circumferential edge of the sealing plate, and the sealing rib is received in the sealing groove of the extension of the outer wall.

Preferably, an end face of the inner wall defines an annular sealing groove, a sealing plate is mounted to the end face of the inner wall, an annular sealing rib protrudes from a circumferential edge of the sealing plate, and the sealing rib is received in the sealing groove of the inner wall.

Preferably, the extension of the outer wall forms a supporting face in the receiving space, the circuit assembly further comprises a support bracket mounted to the supporting face, a conducting plate disposed on the support bracket, and a circuit board electrically connected to the conducting plate, the electronic components received in the receiving space of the support member are mounted to the support bracket and electrically connected to the conducting plate.

Preferably, an outer surface of the extension of the outer wall is provided with a plurality of heat dissipating fins.

Preferably, the circuit assembly further comprises a plurality of electronic components disposed at a plurality of edges of the support bracket, the plurality of electronic components are adjacent the heat dissipating fins and electrically connected with the conducting plate.

Preferably, the rotor comprises a housing and a plurality of permanent magnets, a portion of the housing is recessed inwardly to form a bearing seat, the motor shaft is a fixed shaft, one end of the fixed shaft is fixed to the support member, the other end of the fixed shaft is movably connected to the bearing seat through bearings, the permanent magnets are arranged along an inner circumferential periphery of the housing, the stator is received in the housing and comprises a stator core, a plurality of stator windings wound around the stator core, and an insulating bracket disposed between the stator core and the stator windings, the stator core comprises a yoke and teeth extending outwardly from the yoke, the insulating bracket comprises a main portion covering the yoke and a plurality of extensions extending outwardly from the main portion for covering the teeth of the stator core, an inner side of the main portion defines an accommodating cavity, and the support member is at least partially received in the accommodating cavity.

The support member is partially received in the inner side of the stator, and the circuit assembly is at least partially received in the support member, which makes the motor have a relatively smaller axial size.

DETAILED DESCRIPTION OF THE PREFERRED EMBODIMENTS

As shown in FIG. 1 to FIG. 4, a motor 100 in accordance with one embodiment includes a motor shaft 10, a rotor 20, a stator 30, a support member 40, a circuit assembly 50, and a sealing member 60. In this embodiment, the motor shaft 10 is a rotary shaft, and the motor 100 is a brushless direct current motor which can be utilized in a cooling module of a car engine.

Figure 8:
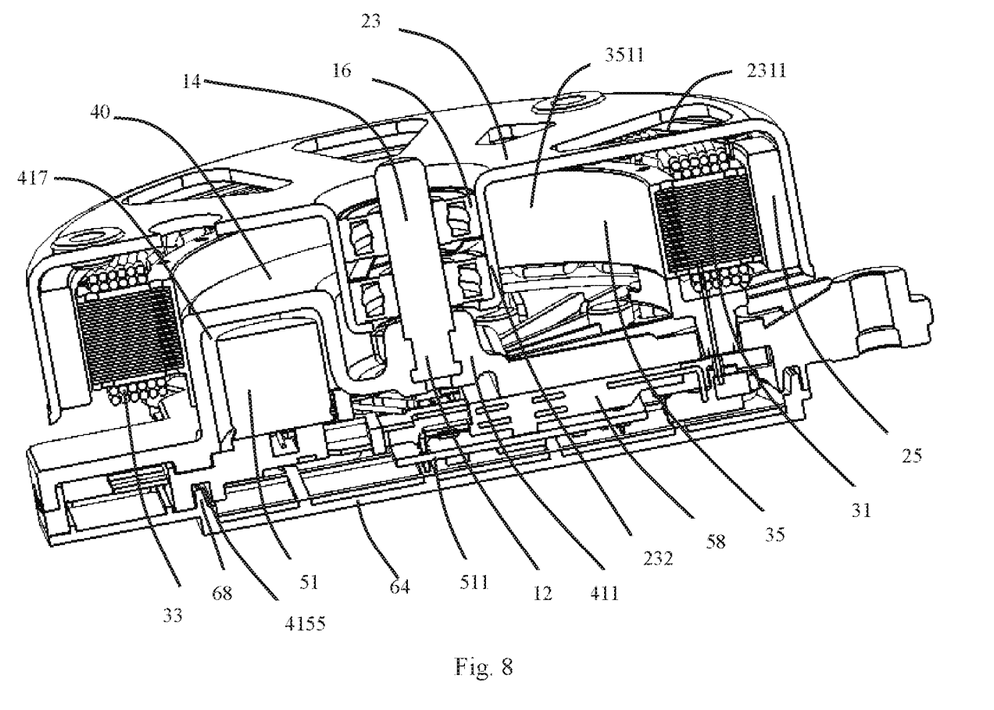
FIG. 8 is a sectional view of a motor according to another embodiment of the present invention.

The rotor 20 includes the rotary shaft 10, a housing 23, and a plurality of permanent magnets 25. The rotary shaft 10 includes a connecting end 12 and an output end 14 opposite from each other. The housing 23 includes a cover portion 231 and a surrounding portion 233. The cover portion 231 is circular disc-shaped and fixedly attached around the output end 14 of the rotary shaft 10. The cover portion 231 defines a plurality of ventilation slots 2311 (FIG. 8). The surrounding portion 233 extends from a circumferential edge of the cover portion 231 toward one end of the housing 23 where the connecting end 12 of the rotary shaft 10 is located and cooperates with the cover portion 231 to define a cylindrical receiving chamber 235. The receiving chamber 235 is in communication with the ventilation slots 2311. The permanent magnets 25 are fixed to an inner surface of the surrounding portion 233 and evenly spaced along a circumferential direction of the housing 23.

Figure 5:
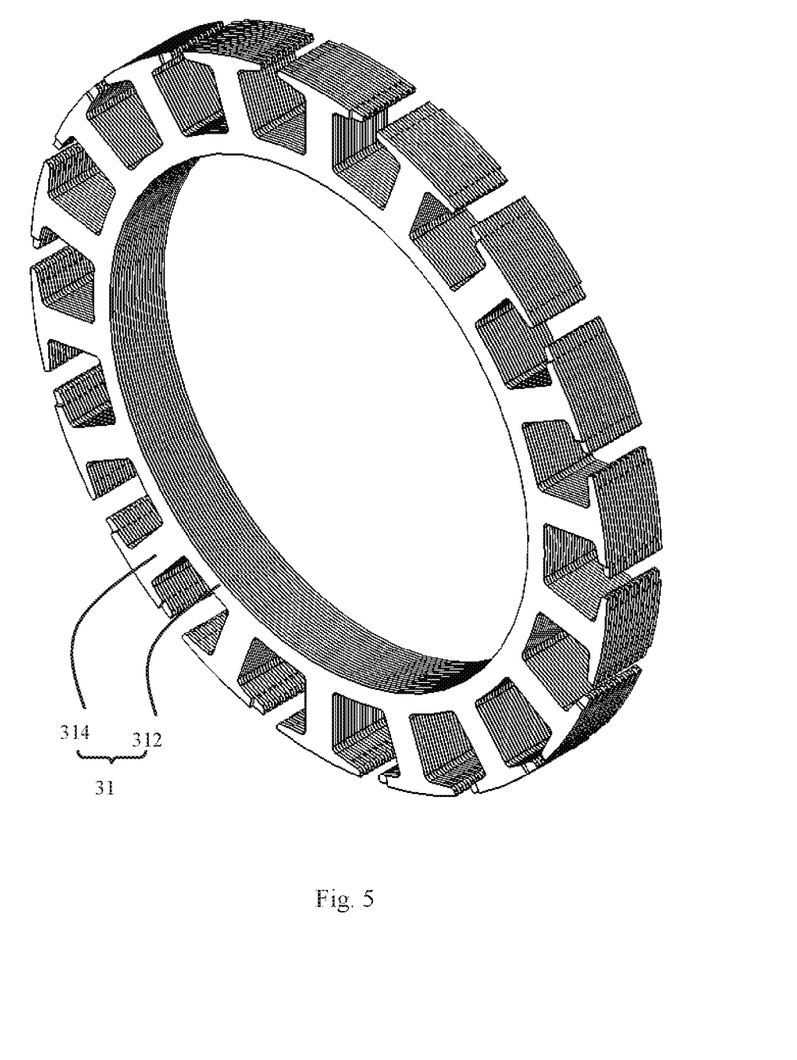
FIG. 5 is a perspective view of a stator core of the motor of FIG. 1.

The stator 30 is received in the receiving chamber 235 of the housing 23 and opposed to the permanent magnets 25 of the rotor 20. The stator 30 is spaced from the cover portion 231 of the housing 23 so that the rotor 20 is rotatable relative to the stator 30. The stator 30 includes a stator core 31, a plurality of stator windings 33 (FIG. 8) wound around the stator core 31, and an insulating bracket 35 disposed between the stator core 31 and the stator windings 33. Referring to FIG. 5, the stator core 31 includes an annular yoke 312 and a plurality of teeth 314 extending outwardly from the yoke 312. The yoke 312 defines an interior cylindrical chamber. The stator windings 33 are wound around the teeth 314. Preferably, the stator core 31 is formed by winding a strip-shaped lamination in a manner as described in China Patent Application No. 201510280698.1 filed by the same applicant, the entire content of which is incorporated herein by reference. The insulating bracket 35 includes an annular main portion 351 and extensions 353 extending outwardly from the main portion 351. The main portion 351 covers the annular yoke 312 of the stator core 31. An inner diameter of the main portion 351 is far greater than an outer diameter of the rotary shaft 10. An inner side of the main portion 351 cooperatively defines an accommodating cavity 3511. The rotary shaft 10 passes through the accommodating cavity 3511. The extensions 353 of the insulating bracket 35 cover the teeth 314 of the stator core 31 to insulate the stator core 31 from the stator windings 33.

Figure 1:
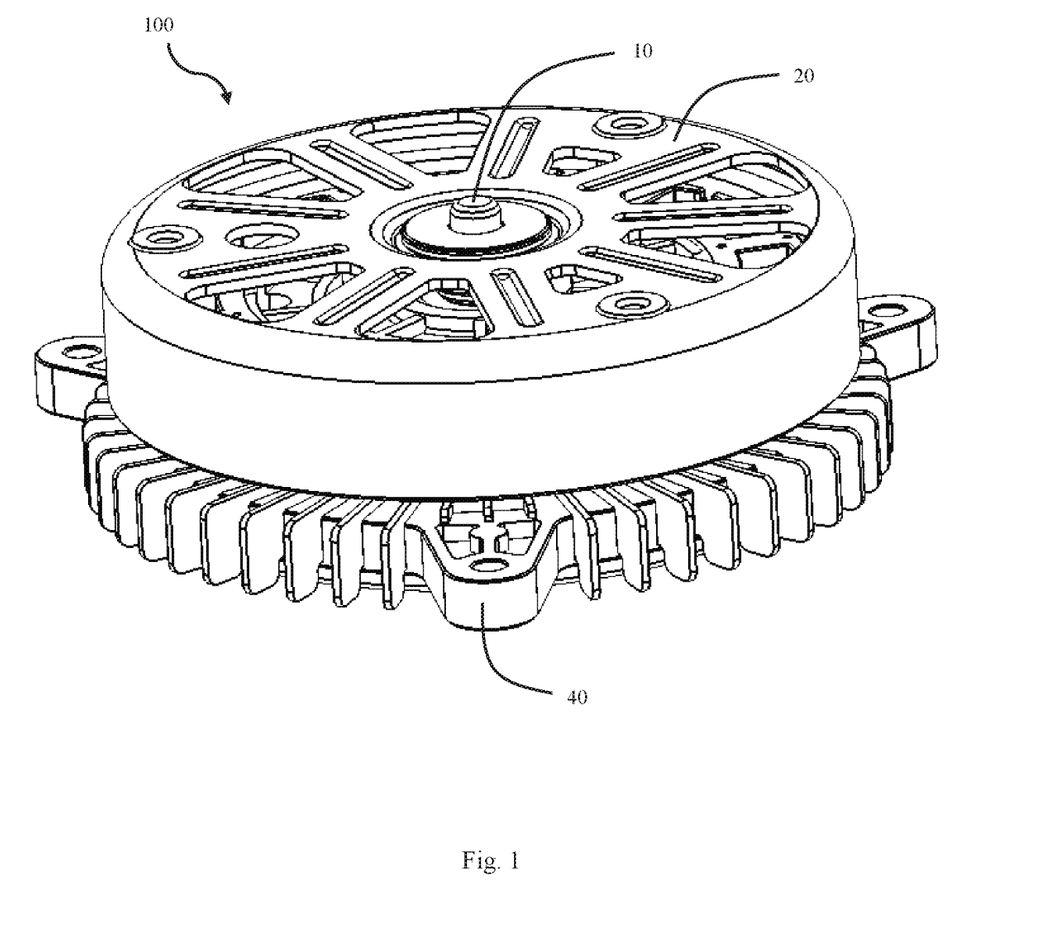
FIG. 1 is a perspective view of a motor according to one embodiment.
Figure 2:
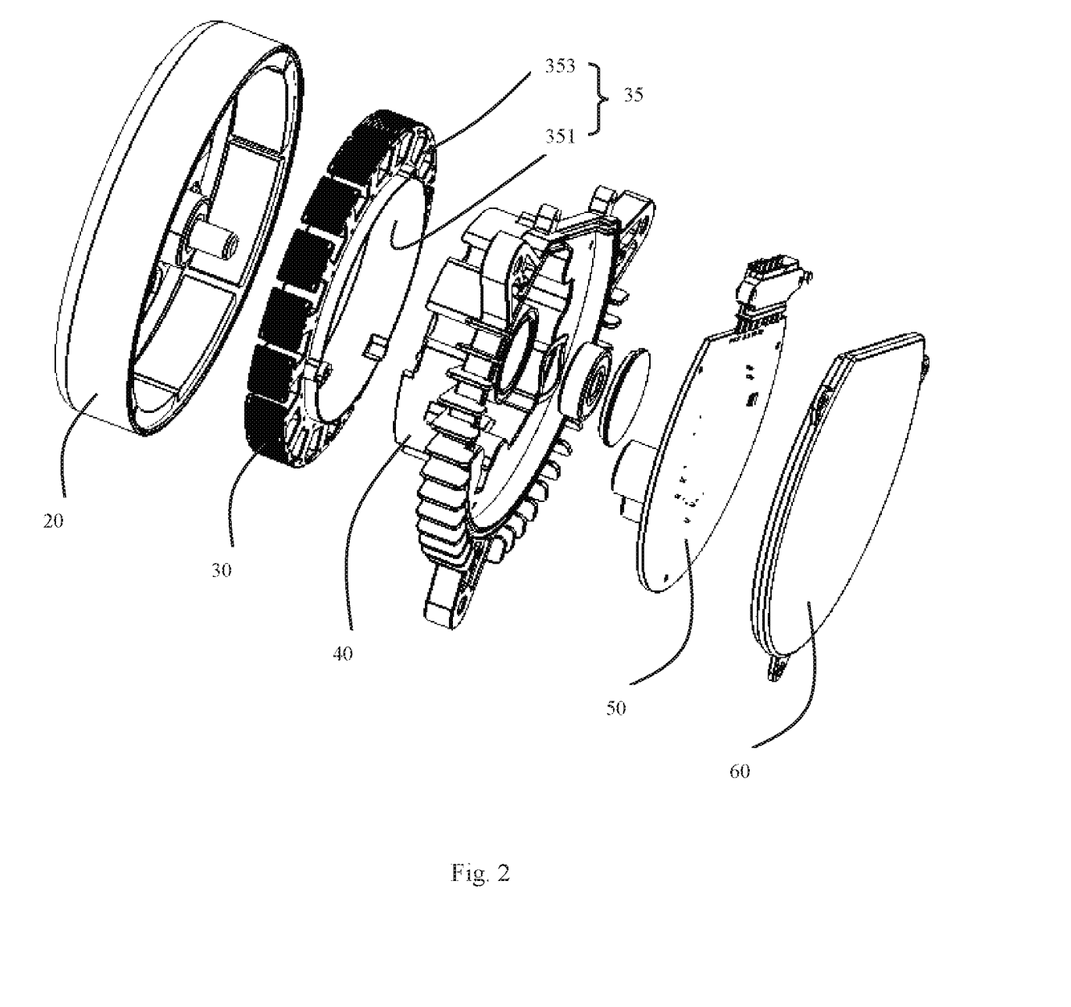
FIG. 2 is a perspective, exploded view of the motor of FIG. 1.
Figure 3:
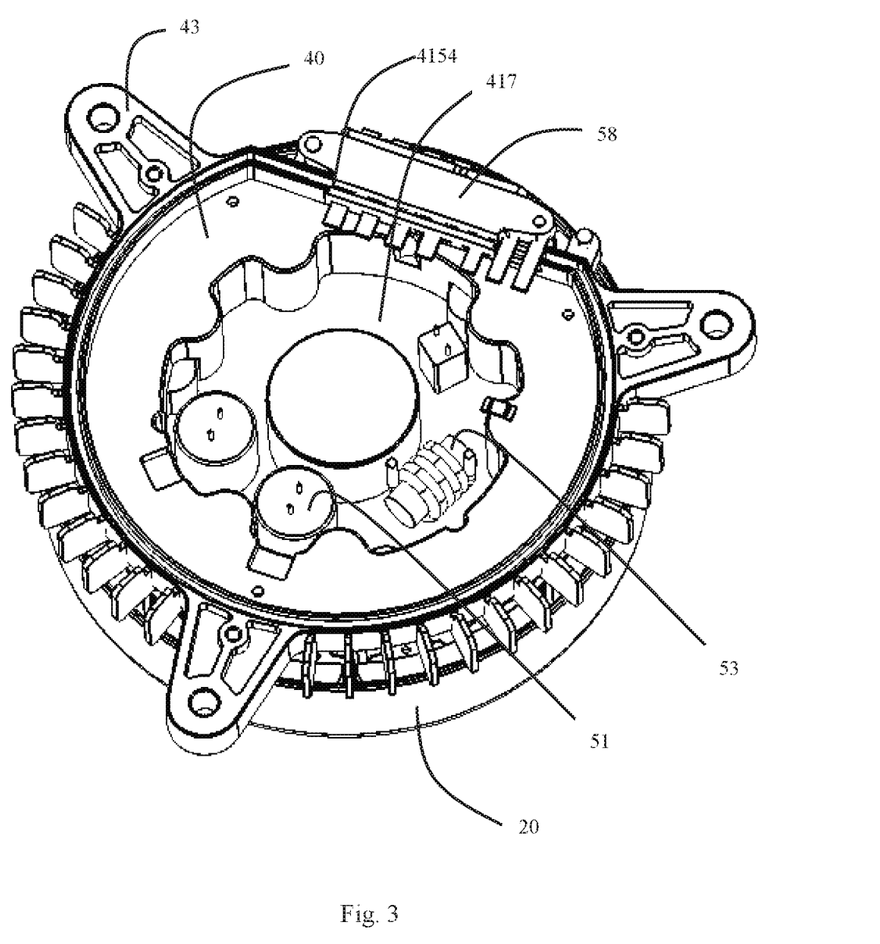
FIG. 3 is a perspective view of the motor of FIG. 1, with a circuit board and a support member of the motor being removed.
Figure 4:
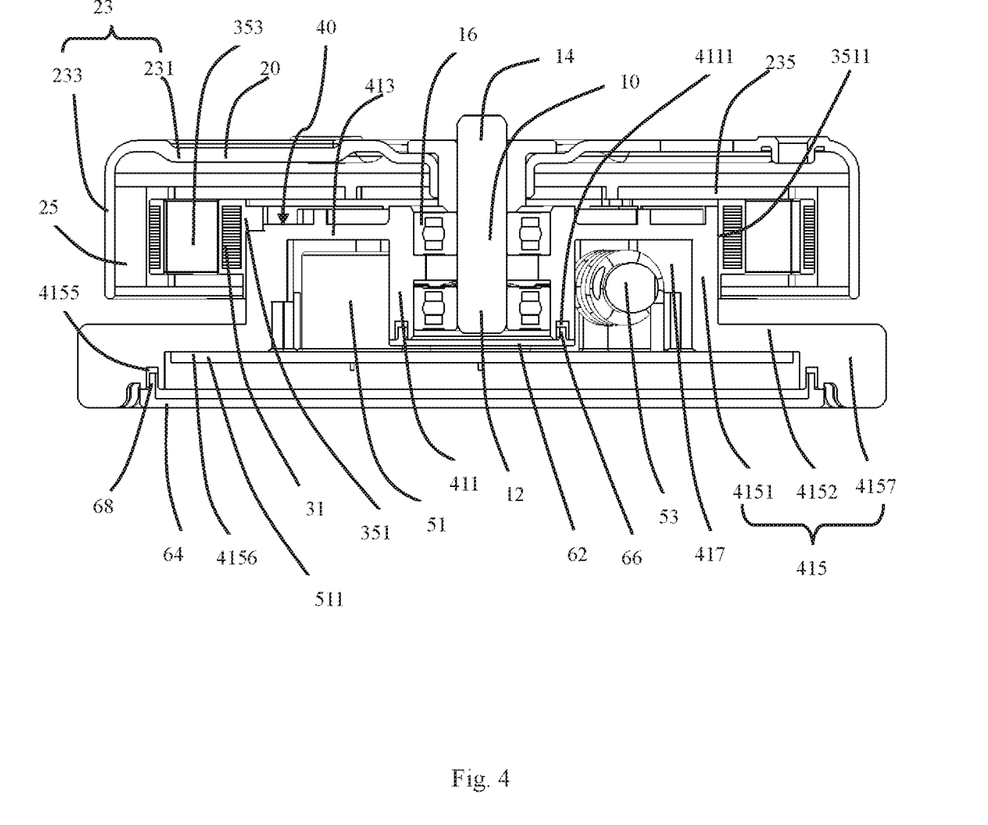
FIG. 4 is a longitudinal sectional view of the motor of FIG. 1.
Figure 6:
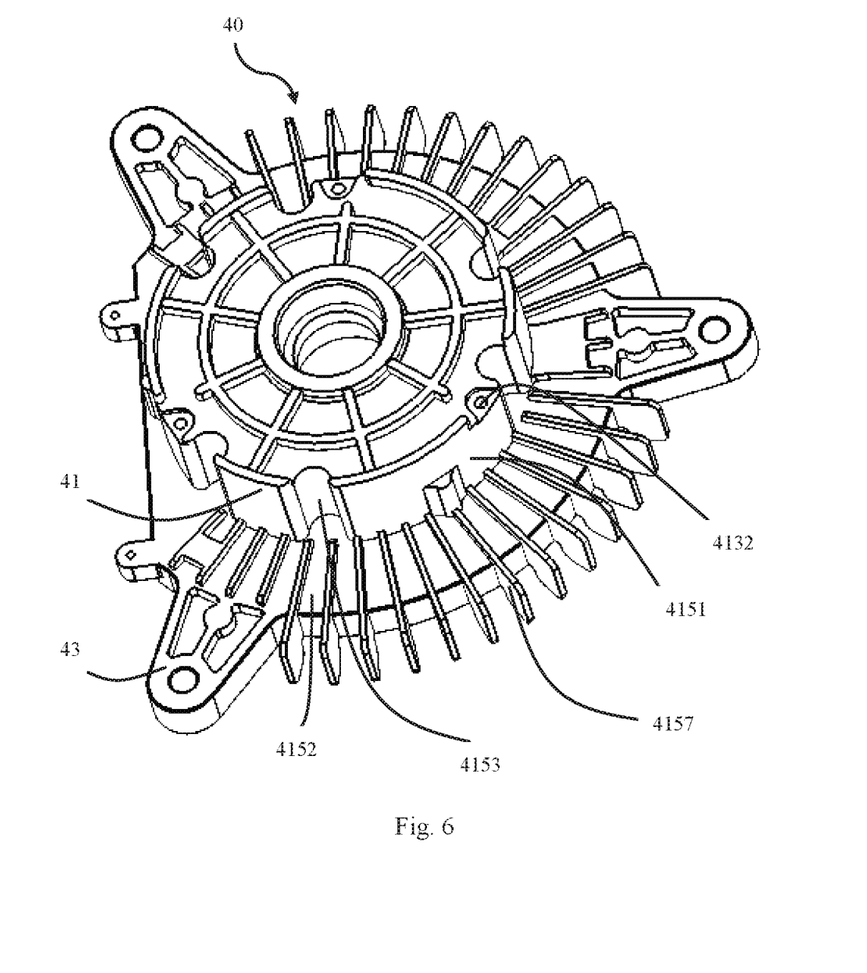
FIG. 6 is a perspective view of the support member of the motor of FIG. 1.

Referring to FIG. 3, FIG. 4, and FIG. 6, the support member 40 is preferably made from a thermally conductive material such as cast-aluminum, which is partially received in the accommodating cavity 3511 of the stator 30. The support member 40 includes a main receiving body 41 and a plurality of mounting portions 43 extending outwardly from a circumferential edge of the main receiving body 41. The main receiving body 41 is generally in the form of a circular housing and is partially received in the accommodating cavity 3511. The main receiving body 41 includes an annular inner wall 411, a bottom wall 413, and an outer wall 415. The inner wall 411 is cylindrical, and the connecting end 12 of the rotary shaft 10 is rotatably mounted in an interior of the inner wall 411 through bearings 16. An end face of an axial end of the inner wall 411 is formed with a first sealing groove 4111. The bottom wall 413 extends radially outwardly from a circumferential edge of the other end of the inner wall 411 and is disposed adjacent the cover portion 231 of the housing 23. The outer wall 415 extends from an outer circumferential edge of the bottom wall 413 in a direction away from the cover portion 231. The outer wall 415 and the inner wall 411 define a receiving space 417 therebeteween.

The outer wall 415 includes a support portion 4151 and an extension 4152. The support portion 4151 extends from the circumferential edge of the bottom wall 413 in an axial direction of the rotary shaft 10 and toward one side of the outer wall 415 where the connecting end 12 of the rotary shaft 10 is located. The support portion 4151 is disposed at an inner side of the main portion 351 of the stator 30. An outer circumferential edge of the support portion 4151 is recessed to form a plurality of airflow grooves 4153 (FIG. 6) evenly spaced along the circumferential edge of the support portion 4151, with an end of each airflow groove 4153 in communication with one ventilation slot 2311. The extension 4152 extends radially outwardly from a circumferential edge of a distal end of the support portion 4151 and then extends in a direction away from the housing 23. A projection of the extension 4152 along an axial direction of the rotary shaft 10 is generally annular, and a cutout 4154 is defined in one side of the extension 4152.

In this embodiment, the extension 4152 is located outside the receiving chamber 235 of the housing 23 and spaced from axial distal ends of the surrounding portion 233 of the housing 23 and the stator 30, such that ends of the airflow grooves 4153 of the support portion 4151 opposite from the ventilation slots 2311 can extend to the extension 4152 to be in communication with the outside environment. An end face of the extension 4152 defines an annular second sealing groove 4155. An annular supporting face 4156 is formed within the receiving space 417 and on one end of the extension 4152 away from the cover portion 231 of the housing 23. A plane in which the supporting face 4156 is located is perpendicular to the axial direction of the rotary shaft 10. The mounting portion 43 extends outwardly along an axial direction of the outer wall 415. Preferably, an outer surface of the extension 4152 is provided with a plurality of heat dissipating fins 4157.

Figure 7:
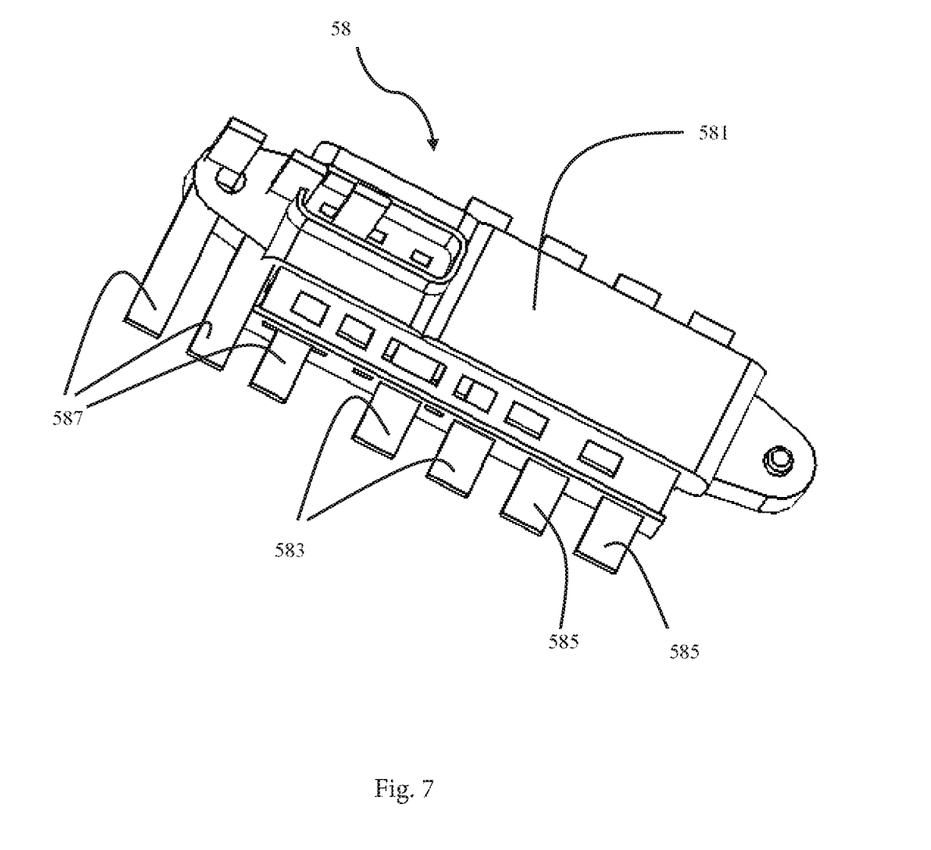
FIG. 7 is a perspective view of a plug-connection module of the motor of FIG. 1.

The circuit assembly 50 includes a circuit board 511, electronic components electrically connected to the circuit board 511, and an electrical plug-connection module 58. The circuit board 511 is circular, and is affixed to the supporting face 4156 of the outer wall 415 and received in the receiving space 417. The electronic components are discretely disposed on a single side or both sides of the circuit board 511 and are electrically connected to the circuit board. Electronic components occupying a large space, such as capacitors 51 and inductors 53, are disposed on one side of the circuit board 511 toward the receiving space 417 and are partially or completely received in the receiving space 417, while other electronic components with lower profile can be disposed on the other side of the circuit board 511 opposite from the receiving space 417. The electrical plug-connection module 58 is disposed at the cutout 4154 of the support member 40 and is supported on the stator 30. Referring to FIG. 7, the electrical plug-connection module 58 includes a support housing 581, and power pins 583, signal pins 585 and wiring pins 587 that are inserted into the support housing 581. The wiring pins 587 are used to supply power to the stator windings of the motor. The support housing 581 covers the cutout 4154. The power pins 583, the signal pins 585 and the wiring pins 587 are arranged in parallel and each has one end electrically connected to the circuit board 511. The other ends of the power pins 583 and the signal pins 585 are configured to connect to a car control assembly to receive power and control signals, and the other ends of the wiring pins 587 are connected to the windings of the motor. In this embodiment, the windings of the motor are connected into a three-phase configuration, and the circuit board 511 is a printed circuit board.

The sealing member 60 includes a first sealing plate 62 and a second sealing plate 64. The first sealing plate 62 is fixed to one end of the inner wall 411 of the support member 40 adjacent the circuit board 511. The second sealing plate 64 is mounted to one side of the support member 40 away from the housing 31 and covers the circuit board 511 and the electronic components on the circuit board 511. The second sealing plate 64 and the circuit board 511 are spaced by a distance to allow the electronic components to be coupled to the circuit board 511. An annular sealing rib 66 protrudes from a circumferential edge of the first sealing plate 62, and the sealing rib 66 is received in the first sealing groove 4111 of the inner wall 411 of the support member 40. An annular sealing rib 68 protrudes from a circumferential edge of the second sealing plate 64, and the sealing rib 68 is received in the second sealing groove 4155 of the extension 4152 of the support member 40.

In assembly, the rotor 20 is fixedly attached around the output end 14 of the rotary shaft 10. The stator 30 is fixedly mounted to the support member 40. Specifically, the insulating bracket of the stator 30 defines through holes, the bottom wall 413 of the support member 40 defines mounting holes, and fasteners such as screws can be fixed in the respective mounting holes after passing through the respective through holes, thus fixing the stator 30 to the support member 40. The connecting end 12 of the rotary shaft 10 is then rotatably mounted to the inner wall 411 of the support member 40. The first sealing plate 62 is mounted to the inner wall 411 of the support member 40, and the circuit assembly 50 is received in the support member 40. Finally, the second sealing plate 64 is mounted to the extension 4152 of the support member 40, thus enclosing the circuit board 50 in the support member 40.

During operation, an external power supply transmits power and control signals to the circuit board 511 through the electrical plug-connection module 58. Upon being energized, the stator windings 33 of the stator 30 produce an electromagnetic field which interacts with the permanent magnets 25 of the rotor 20 to drive the rotor 20 and the rotary shaft 10 to rotate, thus outputting power.

The support member 40 is at least partially received in and supported in the inner side of the stator 30, the part of the support member 40 received in the inner side of the stator 30 defines the receiving space 417, and some of the electronic components of the circuit assembly 50 that occupy a large space, such as the capacitors and inductors, are received in the receiving space 417 of the support member 40, which makes the motor 100 have a relatively smaller axial size. In comparison with the existing motor, the thickness of the motor 100 can decrease from 70.8 mm to 55 mm, i.e. by more than 20%.

The housing 23 defines the ventilation slots 2311, the airflow grooves 4153 of the support member 4151 of the support member 40 are in communication with the ventilation slots 2311, the extension 4152 of the support member 40 is spaced apart from the housing 23 and the stator 30, and the airflow grooves 4153 extend to the extension 4152 and are in communication with the outside environment. Therefore, the airflow can flow out of the motor 100 sequentially through the ventilation slots 2311 and the airflow grooves 4153, which improves the performance of dissipating the heat of the interior of the motor. In addition, the support member 40 is made from cast aluminum and hence provides a better heat conducting result than plastic, which further increases the heat dissipation performance.

The first sealing rib 66 and second sealing rib 68 of the sealing member 60 are engagingly received in the first sealing groove 4111 and second sealing groove 4155 of the support member 40, respectively, and the support housing 581 of the electrical plug-connection module 58 covers the cutout 4154 of the extension 4152, which improves the water-proof performance of the motor 100.

Figure 9:
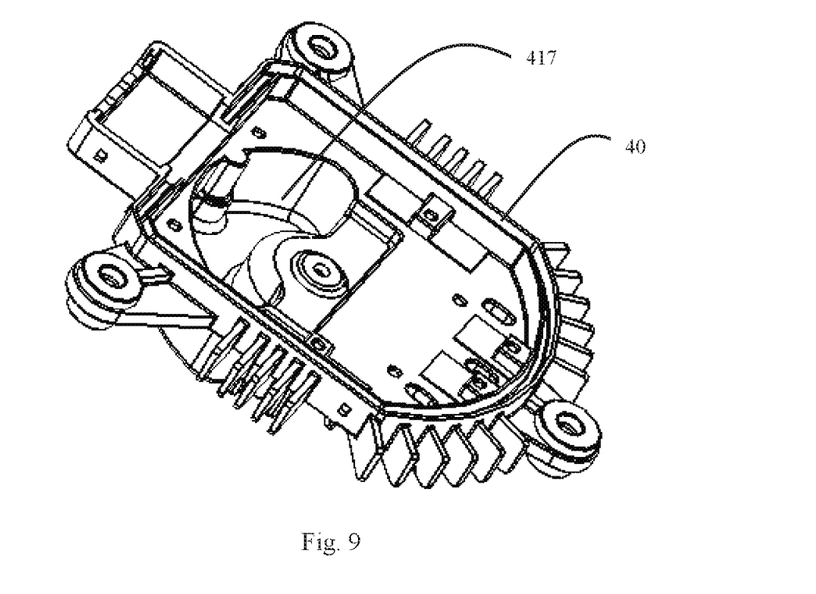
FIG. 9 is a perspective view of the support member of the motor of FIG. 8.

FIG. 8 and FIG. 9 illustrate another embodiment of the motor of the present invention. The motor of this embodiment differs from the motor of the previous embodiment in that: in this embodiment, the motor shaft 10 is a fixed shaft 10 fixed to the support member 40. Specifically, one end 12 of the motor shaft 10 is fixed to the inner wall 411 of the support shaft 40, and the other end 14 of the motor shaft 10 is rotatably mounted to the housing 23 of the rotor 20 through bearings 16, such that the rotor 20 is rotatable about the axis of the motor shaft 10. Specifically, a bearing seat 232 is formed at a central area of the housing 23 of the rotor 20 by a drawing process, and the bearings 16 are fixedly received in the bearing seat 232. In this embodiment, the receiving space 417 of the support member 40 does not extend along the entire circumference of the support member 40, i.e. the support member 40 occupies only a portion of the accommodating cavity 3511 of the stator along the circumferential direction of the support member 40, such that another portion of the accommodating cavity can be left for arrangement of other components.

Figure 10:
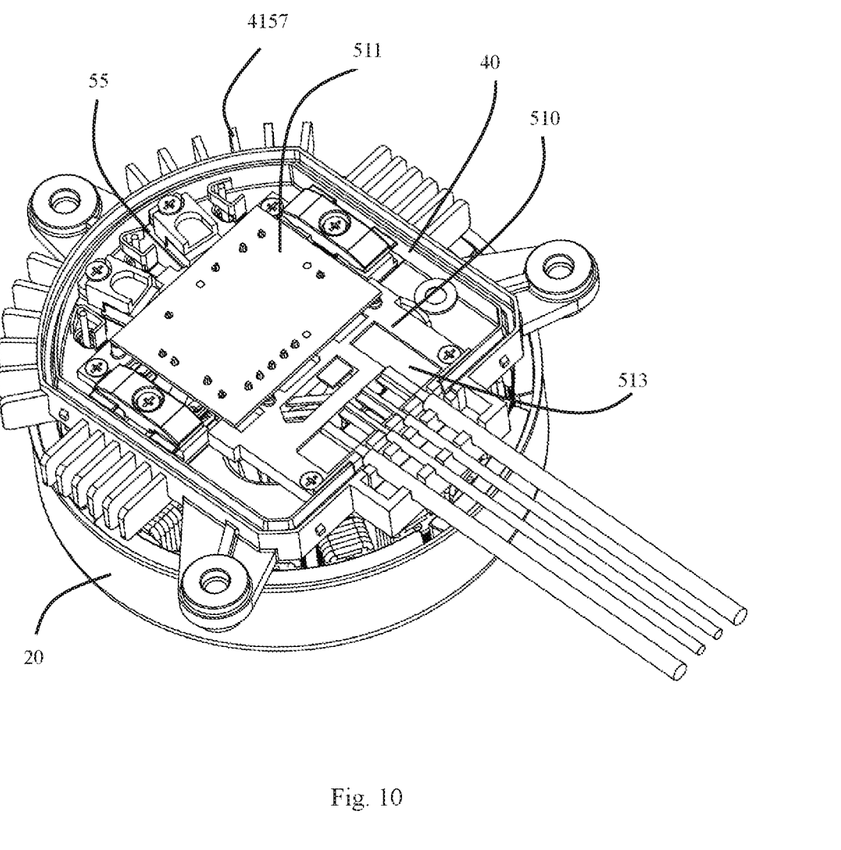
FIG. 10 is a perspective view of a circuit assembly mounted to a motor according to still another embodiment of the present invention.
Figure 11:
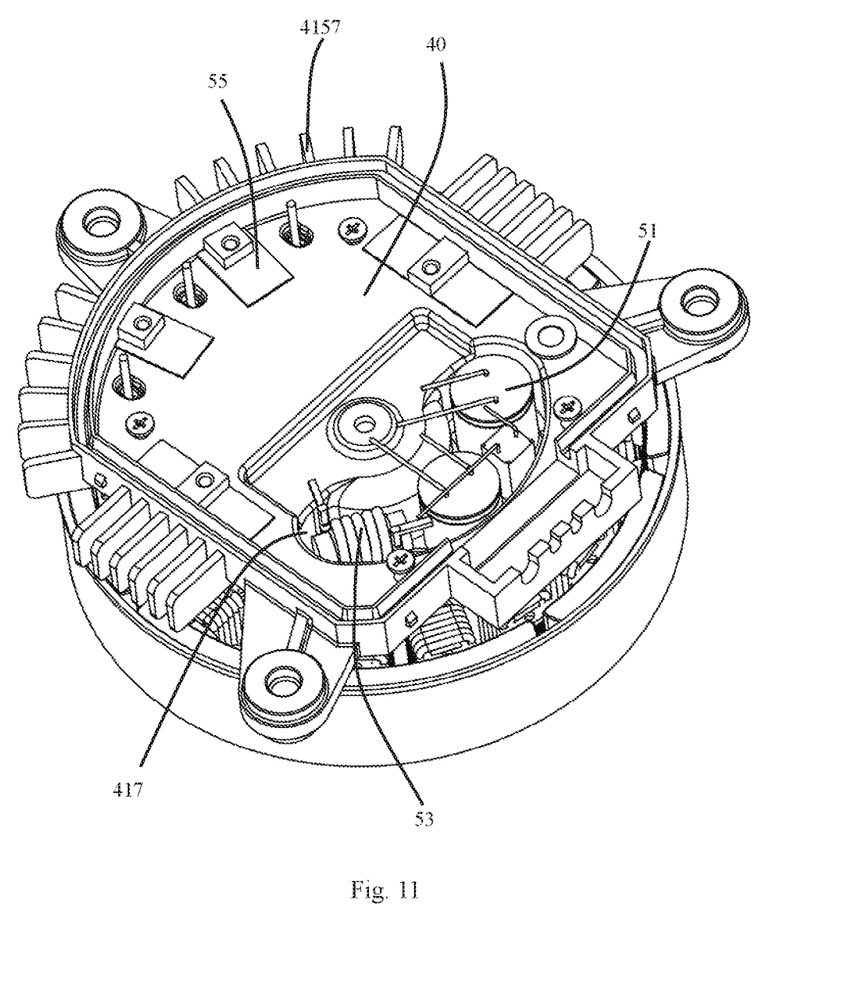
FIG. 11 is similar to FIG. 10, with the circuit board, support bracket and conducting plate of the circuit assembly being removed.
Figure 12:
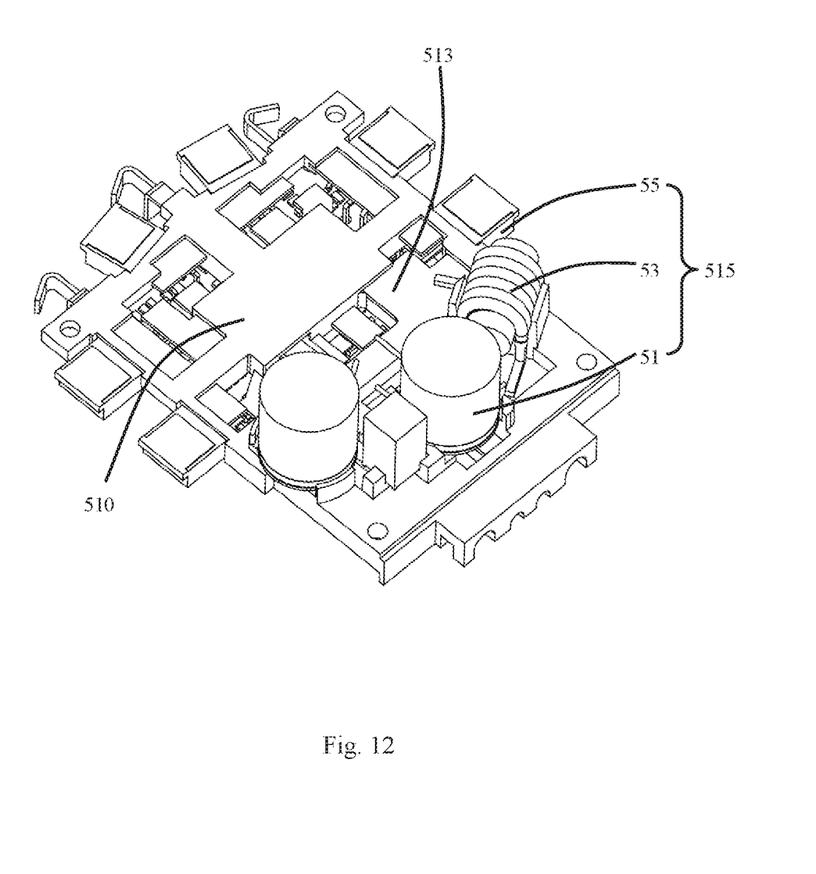
FIG. 12 is a perspective view of the circuit assembly of FIG. 10, viewed from another aspect.

FIG. 10 to FIG. 12 illustrate another embodiment of the motor of the present invention. In this embodiment, the circuit assembly includes a support bracket 510 defining a plurality of through holes, a conducting plate 513 disposed on the support bracket 510, and a circuit board 511 electrically connected to the conducting plate 513, a plurality of first electronic components (not shown) disposed on the circuit board 511, and a plurality of second electronic components 515 electrically connected with the conducting plate 513. The second electronic components 515 include electronic components that occupy a large space, such as capacitors 51, inductors 53 and MOSFETs 55. In this embodiment, the capacitors 51, the inductors 53 and the circuit board 511 are fixed at opposite sides of the support bracket 510. The capacitors 51 and inductors 53 pass through the through holes of the support bracket 510 and are then electrically connected with the conducting plate 513. The MOSFETs 55 are spaced apart from each other and disposed at a plurality of edges of the support bracket 510, and are electrically connected with the conducting plate 513. The electronic components of the circuit assembly are discretely arranged, which facilitates the heat dissipation and effective space utilization. In mounting the circuit assembly in the support member 40, i.e. disposing it at one side of the extension 4152 opposite from the cover portion 231, part of the second electronic components 515 of the circuit assembly 50 that occupy a large space, such as the capacitor 51 and inductor 53, are received in the receiving space 417 of the support member 40, which makes the motor have a relatively smaller axial size. Another part of the second electronic components 515, such as the MOSFETs 55 disposed at the plurality of edges of the support bracket 510, are disposed adjacent the heating dissipating fins 4157, such that heat generated by this part of the second electronic components 515 can be quickly dissipated out.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A motor comprising:
a stator, a radial inner side of which has an accommodating cavity;
a support member at least partially received in and fixed to the accommodating cavity of the stator, a portion of the support member received in the accommodating cavity of the stator defining a receiving space;
a rotor rotatably mounted to the support member, with the stator received in the rotor; and
a circuit assembly comprising a plurality of electronic components, at least part of the electronic components received in the receiving space;
wherein the rotor comprises a housing and a plurality of permanent magnets, the housing comprises a cover portion and a surrounding portion, the cover portion defines a plurality of ventilation slots, and the accommodating cavity of the stator is in communication with the ventilation slots herein the motor further comprises a motor shaft, one end of the motor shaft is fixed to one of the rotor and the support member, and the other end of the motor shaft is rotatably mounted to the other one of the rotor and the support member;
wherein the support member comprises an inner wall, a bottom wall and an outer wall, the motor shaft is mounted to the inner wall, the bottom wall extends radially outwardly from a circumferential edge of one end of the inner wall that extends into the stator, the outer wall extends from a circumferential edge of the bottom wall in a direction away from the stator, and the outer wall and the inner wall define the receiving space therebetween;
wherein the outer wall comprises a support portion and an extension, the support portion extends from the circumferential edge of the bottom wall in a direction away from the stator, the support portion is at least partially disposed at the inner side of the stator, the extension of the outer wall extends radially outwardly from a circumferential edge of a distal end of the support portion and is disposed outside the stator, and the extension of the outer wall is spaced from the housing of the rotor and the stator along an axial direction of the motor; and
wherein the motor is a brushless direct current motor, and the support member is made from a thermally conductive material.

2. The motor of claim 1, wherein the motor shaft is a rotary shaft having a connecting end and an output end, the housing is fixed to the output end of the rotary shaft, the permanent magnets are arranged along an inner circumferential periphery of the housing, the stator is received in the housing and comprises a stator core, stator windings wound around the stator core, and an insulating bracket disposed between the stator core and the stator windings, the stator core comprises a yoke and teeth extending outwardly from the yoke, and the insulating bracket comprises a main portion covering the yoke and a plurality of extensions extending outwardly from the main portion and covering the teeth.

3. The motor of claim 1, wherein the cover portion of the housing of the rotor is fixedly attached around an end of the motor shaft, an outer circumferential edge of the support portion is recessed to form a plurality of airflow grooves, first ends of the airflow grooves are in communication with the ventilation slots, and second ends of the airflow grooves extend to the extension to communicate with an outside environment.

4. The motor of claim 1, wherein the extension of the outer wall forms a supporting face in the receiving space, the circuit assembly further comprises a circuit board, the electronic components are electrically connected to the circuit board, and the circuit board is coupled to the supporting face of the extension of the outer wall.

5. The motor of claim 4, wherein the extension of the outer wall forms a cutout at one side thereof, the circuit assembly further comprises an electrical plug-connection module electrically connected to the circuit board, and the electrical plug-connecting module is disposed at the cutout of the extension of the outer wall and supported on the stator.

6. The motor of claim 5, wherein the electrical plug-connection module comprises a support housing and power pins, signal pins and wiring pins extending into the support housing, the support housing covers the cutout, the power pins, signal pins and wiring pins are arranged in parallel and electrically connected to the circuit board, and the wiring pins are electrically connected to stator windings of the stator.

7. The motor of claim 1, wherein an end face of the extension of the outer wall defines an annular sealing groove, a sealing plate is mounted to one side of the support member opposite from the rotor and covers the circuit assembly, an annular sealing rib protrudes from a circumferential edge of the sealing plate, and the sealing rib is received in the sealing groove of the extension of the outer wall.

8. The motor of claim 1, wherein an end face of the inner wall defines an annular sealing groove, a sealing plate is mounted to the end face of the inner wall, an annular sealing rib protrudes from a circumferential edge of the sealing plate, and the sealing rib is received in the sealing groove of the inner wall.

9. The motor of claim 1, wherein the extension of the outer wall forms a supporting face in the receiving space, the circuit assembly further comprises a support bracket mounted to the supporting face, a conducting plate disposed on the support bracket, and a circuit board electrically connected to the conducting plate, the electronic components received in the receiving space of the support member are mounted to the support bracket and electrically connected to the conducting plate.

10. The motor of claim 9, wherein an outer surface of the extension of the outer wall is provided with a plurality of heat dissipating fins.

11. The motor of claim 10, wherein the circuit assembly further comprises a plurality of electronic components disposed at a plurality of edges of the support bracket, the plurality of electronic components are adjacent the heat dissipating fins and electrically connected with the conducting plate.

12. The motor of claim 1, wherein a portion of the housing of the rotor is recessed inwardly to form a bearing seat, the motor shaft is a fixed shaft, one end of the fixed shaft is fixed to the support member, the other end of the fixed shaft is movably connected to the bearing seat through bearings, the permanent magnets are arranged along an inner circumferential periphery of the housing, the stator is received in the housing and comprises a stator core, a plurality of stator windings wound around the stator core, and an insulating bracket disposed between the stator core and the stator windings, the stator core comprises a yoke and teeth extending outwardly from the yoke, the insulating bracket comprises a main portion covering the yoke and a plurality of extensions extending outwardly from the main portion for covering the teeth of the stator core, an inner side of the main portion defines an accommodating cavity, and the support member is at least partially received in the accommodating cavity.

13. The motor of claim 1, wherein a flow path is formed between the support member and the radial inner side of the stator, and the flow path is in communicate with the ventilation slots and an outside environment.

14. A motor comprising:
a stator, a radial inner side of which has an accommodating cavity;
a support member at least partially received in and fixed to the accommodating cavity of the stator, a portion of the support member received in the accommodating cavity of the stator defining a receiving space;
a rotor rotatably mounted to the support member, with the stator received in the rotor; and
a circuit assembly comprising a plurality of electronic components, at least part of the electronic components received in the receiving space;
wherein the rotor comprises a housing and a plurality of permanent magnets, the housing comprises a cover portion and a surrounding portion, the cover portion defines a plurality of ventilation slots, the support member comprises an outer wall surrounding the receiving space, an outer circumferential edge of the outer wall is recessed to form a plurality of airflow grooves, first ends of the airflow grooves are in communication with the ventilation slots, and second ends of the airflow grooves extend to the extension to communicate with an outside environment.

15. A motor comprising:
a stator, a radial inner side of which has an accommodating cavity;
a support member at least partially received in and fixed to the accommodating cavity of the stator, a portion of the support member received in the accommodating cavity of the stator defining a receiving space;
a rotor rotatably mounted to the support member, with the stator received in the rotor; and
a circuit assembly comprising a plurality of electronic components, at least part of the electronic components received in the receiving space;
wherein the rotor comprises a housing and a plurality of permanent magnets, the housing comprises a cover portion and a surrounding portion, the cover portion defines a plurality of ventilation slots, and the accommodating cavity of the stator is in communication with the ventilation slots;
the motor further comprises a motor shaft, one end of the motor shaft is fixed to one of the rotor and the support member, and the other end of the motor shaft is rotatably mounted to the other one of the rotor and the support member;

the support member comprises an inner wall, a bottom wall and an outer wall, the motor shaft is mounted to the inner wall, the bottom wall extends radially outwardly from a circumferential edge of one end of the inner wall that extends into the stator, the outer wall extends from a circumferential edge of the bottom wall in a direction away from the stator, and the outer wall and the inner wall define the receiving space therebetween;

the outer wall comprises a support portion and an extension, the support portion extends from the circumferential edge of the bottom wall in a direction away from the stator, the support portion is at least partially disposed at the inner side of the stator, the extension of the outer wall extends radially outwardly from a circumferential edge of a distal end of the support portion and is disposed outside the stator, and the extension of the outer wall is spaced from the housing of the rotor and the stator along an axial direction of the motor; and the extension of the outer wall forms a supporting face in the receiving space, the circuit assembly further comprises a circuit board, the electronic components are electrically connected to the circuit board, and the circuit board is coupled to the supporting face of the extension of the outer wall.

\* \* \* \* \*